3,161,547
RESIN TREATED FLEXIBLE BATTERY
SEPARATORS
Raymond D. Beaulieu, North Wilbraham, Mass., assignor to Monsanto Company, a corporation of Delaware
No Drawing. Filed July 5, 1963, Ser. No. 293,133
13 Claims. (Cl. 136—146)

This invention relates to a novel thermosetting resin composition and to cellulosic fibrous battery separators treated therewith.

Permeable fibrous battery separators are used extensively in batteries of either the conventional "wet charge" lead acid-type or the so-called "dry charge" lead acid-type batteries. These generally consist of fibrous cellulosic sheets which have been treated with a resin to protect the fibrous structure from attack by the battery acid. Generally they are impregnated with a thermosetting type resin such as a phenol-formaldehyde resin which, when advanced to the infusible state, sufficiently protects the fibrous structure of the battery separator from attack by the battery acid.

However, when assembling the battery itself employing the battery separators consisting of a fibrous cellulosic sheet impregnated with a phenol-formaldehyde resin, breaking or cracking of the battery separator is often encountered because of the brittleness of the battery separator due to the resin being advanced to the infusible state. The separators, therefore, require special handling and care when used in assembling batteries. In addition, it is conceivable that during the handling of the assembled batteries either in shipping or actual use that breaking of the battery separators can also occur. If a battery separator cracks, so-called "lead treeing" can occur, which will result in the shorting of adjacent negative and positive plates in a battery cell causing a "dead cell." This seriously shortens the useful life of the battery.

Therefore, it is an object of this invention to provide a novel thermosetting resin composition.

It is another object of this invention to provide permeable cellulosic fibrous battery separators employing the thermosetting resin composition of this invention.

Briefly, the above and other objects of this invention are attained by admixing in an aqueous media a phenol-aldehyde resin and a particular thermoplastic polymer containing carboxylic groups which thermoplastic polymer is either a styrene polymer or an acrylonitrile polymer. In addition, the thermosetting resin composition of this invention is used to treat permeable cellulosic fibrous sheets to prepare battery separators therefrom.

The following examples are set forth to illustrate more clearly the principle and practice of this invention to those skilled in the art and are not to be construed as limitations on the invention. Unless otherwise stated, all parts and percentages are on a weight basis.

EXAMPLE I

Part A

A one-stage water-dilutable phenol-formaldehyde resin is prepared by condensing 2.0 mols of formaldehyde per mol of phenol in the presence of a sodium hydroxide catalyst. The resin so prepared is then adjusted with water to a resin solids content of about 40%.

Part B

Part A is repeated except that the phenolformaldehyde resin is adjusted with water to a resin solids content of about 70%.

Part C

An emulsion polymerized latex of about 40% solids is prepared by the emulsion polymerization of a mixture of monomers consisting of 95 weight percent of styrene and 5 weight percent of acrylic acid.

Part D

Two treating solutions are prepared for treating permeable cellulosic fibrous sheets, 6" x 6". One solution consists of in admixture 90 weight percent of Part A and, correspondingly, 10 weight percent of Part C and the second solution consists of in admixture 90 weight percent of Part B and, correspondingly, 10 weight percent of Part C, respectively. The second treating solution has a total resin solids content of about 68% and it does not coagulate when so admixed. This second treating solution is then diluted to a 40% resin solids content by the addition of water for ease of treating the cellulosic fibrous sheets.

The cellulosic fibrous sheets employed herein have a Gurley air-permeable viscosity of about 15 seconds when using a 5-ounce cylinder and a ¼ sq. in. orifice. The fibrous sheets are then hand-dipped into each treating solution separately and allowed to dry at room temperature for about 30 minutes. The treated fibrous sheets are subjected to a temperature of about 170° C. in an air-circulation oven for about 10 minutes in order to advance the resin to an infusible state. The cured treated samples have a total resin pickup of about 35 weight percent based on the weight of the treated cellulosic fibrous sheets. The cured samples which can now be employed as battery separators are flexible and resilient and each can be bent through an arc of about 100° without breaking.

EXAMPLE II

Example I, Parts A, B, C and D, is repeated except that in place of the styrene acrylic latex, the latex employed herein is prepared from a monomer mixture consisting of 60 weight percent of styrene, 35 weight percent of butadiene and 5 weight percent of acrylic acid.

The resulting cured treated cellulosic fibrous battery separators are flexible and can be bent through an arc of about 180° without breaking.

EXAMPLE III

Example I, Parts A, B, C and D, is repeated except that in place of the styrene-acrylic acid latex, an acrylonitrile-butadiene-acrylic acid latex is used which is prepared by the emulsion polymerization of a monomer mixture consisting of 60 weight percent of acrylonitrile, 35 weight percent of butadiene and 5 weight percent of acrylic acid.

The cellulosic battery separators prepared therefrom have essentially the same flexibility and resiliency of those of Example I, Part D, in that they can also be bent through an arc of at least 180° without cracking.

EXAMPLE IV

Example I, Part A is again repeated and permeable cellulosic fibrous sheets, 6" x 6", are hand-dipped in the phenol-formaldehyde resin solution which contains no modifier and are air dried for about 30 minutes. The treated sheets are then cured in an air-circulating oven at 130° C. for 10 minutes. The sheets have a resin pickup of about 35 weight percent based on the weight of the treated cellulosic fibrous battery separators.

The flexibility of the treated cellulosic fibrous sheets thus prepared, which sheets can be used as battery separators, is very poor in that the separators are brittle and crack when bent through an arc of 45°.

This invention is directed to a novel thermosetting resin composition and to permeable cellulosic fibrous sheets treated therewith. The thermosetting resin composition of this invention consists of an admixture in an aqueous media a phenol-aldehyde resin and a thermoplastic polymer which is either a styrene polymer or an acrylonitrile polymer or mixtures thereof. The important feature of this invention is that it is essential that the thermoplastic polymer employed herein contains carboxylic groups in an amount not sufficient to render the thermoplastic polymer soluble in the aqueous media. The styrene polymer employed herein may be either a copolymer or an interpolymer of styrene. When employing the copolymer, it must be at least 90 weight percent of styrene with the balance being at least one alpha,beta-ethylenically unsaturated carboxylic acid which is copolymerized with the styrene. When employing the interpolymer, the polymer should contain at least 25 weight percent of styrene and at least 0.1 weight percent of at least one alpha,beta-ethylenically unsaturated carboxylic acid interpolymerized therewith with the balance being any other monomer which is also interpolymerized therewith.

The acrylonitrile polymer employed herein may be either a copolymer or an interpolymer of acrylonitrile. The copolymer should contain at least 90 weight percent of acrylonitrile with the balance being at least one alpha,-beta-ethylenically unsaturated carboxylic acid which is copolymerized with the acrylonitrile. When employing the interpolymer, it should contain at least 25 weight percent of acrylonitrile and at least 0.1 weight percent of at least one alpha,beta-ethylenically unsaturated carboxylic acid which is interpolymerized therewith with the balance being any other monomer which is also interpolymerized therewith.

For ease of handling, either the styrene polymer or the acrylonitrile polymer can best be prepared in latex form by the emulsion polymerization process.

When treating permeable cellulosic fibrous sheets with the novel thermosetting resin composition of this invention in order to prepare battery separators, the resin not only protects the cellulosic fibers of the sheet from attack by the battery acid when so employed therein but also imparts flexibility to the battery separator. The examples clearly show the extreme difference in flexibility between battery separators employing the resin system of this invention and with battery separators employing only a phenol-formaldehyde type thermosetting resin. In the first instance, depending upon the resin system of this invention employed, the battery separator can be bent through an arc of up to 180° without cracking. In some cases the flexibility may be even greater than 180° but would depend upon the particular resin composition employed. On the other hand, battery separators employing the phenol-formaldehyde type resin are very brittle and cracked upon bending through an arc at 45°. Therefore, as shown by the examples, it is the resin composition of this invention that imparts flexibility and acid resistance to battery separators prepared from cellulosic fibrous sheets treated with the resin composition of this invention.

In the practice of this invention, any phenolaldehyde resin may be employed herein. Particularly useful, however, are the phenol-formaldehyde resins which are generally prepared by the condensation reaction of about 0.5–3.0 mols of formaldehyde per mol of phenol in the presence of appropriate catalysts. The phenol-formaldehyde resins may be either one-stage resins recovered in water, a one-stage resin recovered in a water-organic solvent system or a liquid novolac two-stage resin having water associated with it. Preparation of these resins is generally well-known and the type of phenol-formaldehyde resin obtained depends upon the ratio of formaldehyde to phenol and the catalyst chosen for the reaction. As is well-known in the art, the catalyst employed in the reaction may be either an acidic or a basic type catalyst depending upon whether a two-stage or one-stage resin is desired. The preferred phenol-aldehyde resin employed in the practice of this invention is a phenol-formaldehyde resin prepared by reacting 1.0–3.0 mols of formaldehyde per mol of phenol in the presence of an alkaline catalyst and wherein the reaction product is recovered in water. The phenol-formaldehyde resin employed in the practice of this invention should have a water tolerance of 0.1 volume of water per 1 volume of resin to greater than 50 volumes of water per 1 volume of resin. However, as a practical limit, the water tolerance should be at least 5 volumes of water per 1 volume of resin.

Typical examples of other phenol-aldehyde resins which can be employed in place of those set forth in the examples are resorcinol formaldehyde, catechol formaldehyde, phenol acetaldehyde and alkalated phenol-formaldehyde resins having an alkyl group containing 1–3 carbon atoms such as xylenol formaldehyde, etc.

As stated previously the thermoplastic polymer that is used in admixture with the phenol-aldehyde resin to prepare the thermosetting resin composition of this invention can be either a styrene polymer or an acrylonitrile polymer or mixtures thereof. The polymers can be either the copolymers or interpolymers of either styrene or acrylonitrile prepared in latex form by the emulsion polymerization process. It is essential in the practice of this invention, however, that one of the monomers employed in preparing the copolymer or the interpolymer of either styrene or acrylonitrile must be a carboxylic acid which is present in an amount not sufficient to render the copolymer or the interpolymer thereof water-soluble. This is necessary since if the thermoplastic polymer is water-soluble, it cannot be successfully employed to prepare cellulosic fibrous battery separators therewith having the desirable properties as obtained with the practice of this invention. As stated, the copolymers of either styrene or acrylonitrile should contain at least 90 weight percent of styrene or acrylonitrile, respectively, and preferably, 93–97 weight percent thereof, respectively, with the balance being an alpha,beta-ethylenically unsaturated carboxylic acid and, preferably, 7–3 weight percent of the alpha,beta-ethylenically unsaturated carboxylic acid.

When employing the interpolymers of either styrene or acrylonitrile, the interpolymers should contain at least 25 weight percent of styrene or acrylonitrile, respectively, and at least 0.1 weight percent of the alpha,beta-ethylenically unsaturated carboxylic acid interpolymerized therewith, respectively, with the balance of the interpolymer being any other monomeric compound which will also interpolymerize with either the styrene and the carboxylic acid monomers or the acrylonitrile and the carboxylic acid monomers. These monomeric compounds are those having the vinylidene group $CH_2=C<$, and include such compounds as mono- and diolefins, e.g., ethylene, propylene, isobutylene, butadiene, isoprene, etc.; vinyl halides, e.g., vinyl chloride, vinyl bromide, etc.; vinylidene halides such as vinylidene chloride; esters of vinylidene monocarboxylic acids with 1–18 carbon atoms with monohydric alcohols, e.g., methyl acrylate, ethyl acrylate, methyl alpha,chloroacrylate, butyl acrylate, benzyl acrylate, dodecyl acrylate, the corresponding esters of methacrylic acid, etc.; amides and nitriles of vinylidene monocarboxylic acids such as acrylamide, methacrylamide, acrylonitrile, methacrylonitrile, etc.; vinylidene aromatic hydrocarbons and nuclear alkyl and halogen derivatives thereof such as vinyl naphthalene, alphamethylstyrene, vinyl toluene, 2,4-dimethylstyrene, o-, m-, and p-chlorostyrene, 2,5 - dichlorostyrene, 2 - methyl-4-chlorostyrene, etc.; vinyl esters of 1–18 carbon monocarboxylic acids such as vinyl acetate, vinyl stearate, and vinyl benzoate, etc. Other monomers which can be interpolymerized therewith respectively are diesters of maleic acid and fumaric acid with 1–18 carbon atoms with monohydric alcohols. Although the following are not strictly vinylidene monomers in the strict sense of the word, they can be used interchangeably therewith. Typical examples of these monomers are diethyl maleate, dibutyl fumarate, etc. It may be feasible and desirable to employ blends of two or more of the above monomers to be interpolymerized therewith.

As stated previously the essential feature of the instant invention is that the thermoplastic polymer employed herein must contain carboxyl groups in an amount not sufficient to render the modifier water-soluble. With the thermoplastic polymer containing carboxyl groups, high solids containing aqueous thermosetting resin systems can be attained without the need of stabilizers to prevent coagulation of the resin system. This is of extreme advantage in the industry since the use of stabilizers with other resin systems to obtain high resin solids has lead to detrimental and inefficient impregnation of cellulosic fibrous sheets for preparing battery separators therefrom. It must be emphasized, however, that the carboxylic groups present in the thermoplastic polymer must not be of such an amount as to render the thermoplastic polymer water-soluble.

The acid monomers which can be employed herein contain alpha,beta-ethylenically unsaturation and, preferably, a single carboxy group. It should be noted, however, that acids containing more than one carboxylic group can be effectively employed. In fact, acid monomers containing as many as three carboxyl groups have proved to be effective when employed in place of the acrylic acid in the examples of this invention. Typical examples of such preferred acid monomers employed in the practice of this invention are acrylic acid, methacrylic acid, crotonic acid, etc. Other acid monomers which can be employed herein include maleic acid, itaconic acid and half esters of maleic acid and fumaric acid such as monomethyl maleate, monobutyl maleate, monododecyl maleate, monobutyl fumarate, etc.

In the broadest aspect of this invention the acid monomer can be polymerized with any of the mixtures set forth above. Preferably, however, the polymers are prepared from monomer mixtures which will provide polymers having second order transition temperatures not higher than about 50° C. Typical monomer mixtures which can be employed to prepare the thermoplastic polymer latexes of this invention are as set forth below:

(a) 25–50% styrene/30–40% ethyl acrylate/1–10% acrylic and/or methacrylic acid,
(b) 25–75% styrene/20–70% butadiene/1–10% acrylic and/or methacrylic acid,
(c) 45–60% styrene/at least 33% butadiene and 7–3% acrylic acid,
(d) 25–65% acrylonitrile/3–10% butadiene/35–60% 2-ethylhexyl acrylate/2–10% acrylic and/or methacrylic acid,
(e) 25–60% acrylonitrile/3–10% butadiene/35–60% dibutyl fumarate/1–10% acrylic and/or methacrylic acid,
(f) 25–60% acrylonitrile/10–40% butadiene, and 1–10% acrylic and/or methacrylic acid,
(g) 45–60% acrylonitrile/at least 33% butadiene and 7–3% acrylic acid.

The thermosetting resin composition of this invention is an admixture in an aqueous media of the phenol-aldehyde resin and the thermoplastic polymer. The aqueous media may be either water or a mixture of a major portion of water and a minor portion of an organic solvent. The organic solvent that can be employed herein can be either acetone, methanol, ethanol, propanol, isopropanol, butanol, isobutanol, toluene, xylonol, methyl ethyl ketone or mixtures thereof. The amount of organic solvent employed in the mixture of water and the organic solvent will depend upon the thermosetting resin composition desired and in particular the type of thermoplastic polymer used in admixture therewith.

In the practice of this invention, it is also essential that sufficient resin should be deposited on and around the fibers of the permeable cellulosic fibrous sheet so as to impart proper flexibility and sufficient acid resistance to the cellulosic fibrous sheet when employed as a battery separator. As a practical matter, the total amount of resin pickup by the cellulosic fibrous sheet should be 10–60 weight percent and, preferably, 20–45 weight percent of resin solids based on the weight of the treated battery separator.

The thermosetting resin composition of this invention is an admixture of the phenol-aldehyde resin and the thermoplastic polymer. The admixture of the phenol-aldehyde and thermoplastic polymer should be in the proportion on a weight basis of 25–95 weight percent and, preferably, 65–95 weight percent of the phenol-aldehyde resin and, correspondingly, 75–5 weight percent and, preferably, 35–5 weight percent of the thermoplastic polymer. These weight percentages are based upon the solids content of the phenol-aldehyde resin and the thermoplastic polymer.

In the process of preparing the treated permeable cellulosic fibrous sheets which can be used as battery separators, the cellulosic fibrous sheets are impregnated with the resin composition of this invention either by coating or by the saturation technique. The treated cellulosic fibrous sheets are then dried to remove any excess water or solvent that may be present. They can be dried at room temperature or at higher temperatures to speed up the drying of the treated cellulosic fibrous sheets as is employed in the commercial production of battery separators. However, caution should be noted that when employing elevated temperatures only the excess water or solvent should be removed. The treated sheets are then subjected to a temperature of from about 200° F. to about 600° F. in order to advance the thermosetting resin composition to an infusible state. The time of exposure to the higher temperatures will vary depending upon the temperature employed. For example, the treated sheets may be subjected to a temperature of 200° F. for approximately 30 minutes or it may be subjected to a temperature as high as 600° F. for at least 1 minute. In addition, the cellulosic fibrous sheets are generally ribbed to increase resistance to degradation during use thereof as battery separators in a lead acid battery.

Although the cellulosic fibrous sheets employed in the practice of this invention to prepare battery separators are of a cellulosic fibrous structure having a Gurley air-permeable viscosity of about 1–25 seconds when using a 5-ounce cylinder and a ¼ sq. in. orifice, other battery separator structures may be prepared by incorporating the resins of this invention. For example, the resins employed in this invention may be used to bind and coat battery separators prepared from glass fibers or diatomateous earth or combinations of both with or without cellulosic fibers.

The advantages of this invention are found in that the permeable cellulosic battery separators of this invention have excellent flexibility in comparison to permeable cellulosic battery separators employing only a phenol-aldehyde thermosetting type resin. This greatly enhances the ease of handling the battery separators and greatly reduces cracking thereof.

It will thus be seen that the objects set forth above among those made apparent from the description are efficiently attained and since changes may be made in carrying out the above precess and in the compositions set forth without departing from the spirit and scope of this invention, it is intended that all matters contained in the above description shall be interpreted as illustrative and not in a limiting sense.

What is claimed is:

1. A thermosetting resin composition consisting of in admixture in an aqueous media 25–95 weight percent of a phenol-aldehyde resin and, correspondingly, 75–5 weight percent of thermoplastic polymer selected from the group consisting of styrene copolymers and interpolymers and acrylonitrile copolymers and interpolymers, and mixtures thereof, which thermoplastic polymer contains carboxylic groups in an amount not sufficient to render the thermoplastic polymer water-soluble; said styrene copolymers and said acrylonitrile copolymers containing at least 90 weight percent thereof, of styrene and acrylonitrile, respectively, with the balance thereof being at least one alpha,beta-ethylenically unsaturated carboxylic acid which is copolymerized therewith and wherein said styrene interpolymers and said acrylonitrile interpolymers contain (1) at least 25 weight percent of styrene and acrylonitrile, respectively, (2) at least 0.1 weight percent of at least one alpha,beta-ethylenically unsaturated carboxylic acid which is interpolymerized therewith, respectively, and (3) the balance of said interpolymers being any other monomer which is also interpolymerized therewith, respectively; said aqueous media being selected from the group consisting of water and a mixture of a major amount of water and a minor amount of an organic solvent.

2. The thermosetting resin composition of claim 1 wherein the interpolymers contain 0.1–10 weight percent of at least one alpha,beta-ethylenically unsaturated carboxylic acid which is interpolymerized therewith.

3. The thermosetting resin composition of claim 1 wherein the thermoplastic polymer is a copolymer of 93–97 weight percent of styrene and, correspondingly, 7–3 weight percent of acrylic acid.

4. The thermosetting resin composition of claim 1 wherein the thermoplastic polymer is an interpolymer of 45–60 weight percent of styrene, 7–3 weight percent of acrylic acid and at least 33 weight percent of butadiene.

5. The thermosetting resin composition of claim 1 wherein the thermoplastic polymer is an interpolymer of 45–60 weight percent of acrylonitrile, 7–3 weight percent of acrylic acid and at least 33 weight percent of butadiene.

6. The thermosetting resin composition of claim 1 wherein the phenol-aldehyde resin is the condensation reaction product of 1.0–3.0 mols of formaldehyde per mol of phenol.

7. A permeable cellulosic fibrous battery separator treated with a thermosetting resin composition which has been advanced to an infusible state and wherein the resin composition consists of in admixture 25–95 weight percent of a phenol-aldehyde resin and, correspondingly, 75–5 weight percent of a thermoplastic polymer selected from the group consisting of styrene copolymers and interpolmers and acrylonitrile copolymers and interpolymers, and mixtures thereof, which thermoplastic polymer contains carboxylic groups in an amount not sufficient to render the thermoplastic polymer water-soluble; said styrene copolymers and said acrylonitrile copolymers containing at least 90 weight percent thereof of styrene and acrylonitrile, respectively, with the balance thereof being at least one alpha,beta-ethylenically unsaturated carboxylic acid which is copolymerized therewith and wherein said styrene interpolymers and said acrylonitrile interpolymers containing (1) at least 25 weight percent of styrene and acrylonitrile, respectively, (2) at least 0.1 weight percent of at least one alpha,beta-ethylenically unsaturated carboxylic acid which is interpolymerized therewith, respectively, and (3) the balance of said interpolymers being any other monomer which is also interpolymerized therewith, respectively; said aqueous media being selected from the group consisting of water and a mixture of a major amount of water and a minor amount of an organic solvent.

8. The permeable cellulose fibrous battery separator of claim 7 wherein the thermosetting resin composition constitutes 10–60 weight percent of the treated permeable cellulosic fibrous battery separator.

9. The permeable cellulose fibrous battery separator of claim 7 wherein the interpolymers contain 0.1–10 weight percent of at least one alpha,beta-ethylenically unsaturated carboxylic acid which is interpolymerized therewith.

10. The permeable cellulosic fibrous battery separator of claim 7 wherein the thermoplastic polymer is a copolymer of 93–97 weight percent of styrene and, correspondingly, 7–3 weight percent of acrylic acid.

11. The permeable cellulosic fibrous battery separator of claim 7 wherein the thermoplastic polymer is an interpolymer of 45–60 weight percent of styrene, 7–3 weight percent of acrylic acid and at least 33 weight percent of butadiene.

12. The permeable cellulosic fibrous battery separator of claim 7 wherein the thermoplastic polymer is an interpolymer of 45–60 weight percent of acrylonitrile, 7–3 weight percent of acrylic acid and at least 33 weight percent of butadiene.

13. The permeable cellulosic fibrous battery separator of claim 7 wherein the phenol-aldehyde resin is the condensation reaction product of 1.0–3.0 mols of formaldehyde per mol of phenol.

References Cited in the file of this patent
UNITED STATES PATENTS

| | | |
|---|---|---|
| 2,810,775 | Raphael et al. | Oct. 22, 1957 |
| 2,877,136 | Booth | Mar. 10, 1959 |
| 2,960,559 | Magill et al. | Nov. 15, 1960 |